United States Patent [19]

Herliczek et al.

[11] 4,251,572

[45] Feb. 17, 1981

[54] METHOD OF RESTORING OR REPAIRING REFLECTIVE GLASS

[75] Inventors: Siegfried H. Herliczek, Ottawa Lake, Mich.; Lazarus D. Thomas, Maumee, Ohio

[73] Assignee: Libbey-Owens-Ford Company, Toledo, Ohio

[21] Appl. No.: 640,035

[22] Filed: Dec. 12, 1975

[51] Int. Cl.³ ............................................. B32B 35/00
[52] U.S. Cl. ..................................... 427/142; 156/94; 156/98; 156/234; 156/237; 156/239; 264/36; 427/140; 427/161; 427/165; 427/266; 427/269; 427/287; 428/432; 428/433; 428/913; 428/914
[58] Field of Search .............. 427/140, 142, 147, 148, 427/161, 165–169, 269, 287, 367, 369, 266; 264/36; 156/94, 98, 234–240; 428/432, 913, 914, 433

[56] References Cited

U.S. PATENT DOCUMENTS

| | | |
|---|---|---|
| 2,826,508 | 3/1958 | Giles . |
| 3,063,881 | 11/1962 | Harwig ............................ 427/140 X |
| 3,549,446 | 12/1970 | Bennett et al. .................. 428/914 X |
| 3,705,047 | 12/1972 | Marriott ........................... 427/140 X |

*Primary Examiner*—Bruce H. Hess
*Attorney, Agent, or Firm*—Collins, Oberlin & Darr

[57] ABSTRACT

Methods of restoring or repairing damaged areas in the coating of high performance reflective glass composed of a thin, transparent film such as a metal and/or a metal oxide deposited on a vitreous substrate. Damages to the film such as scratches, abrasive rubs and the like are covered with a compatible filler to substantially restore the light transmittance characteristics. The repaired areas are covered with a protective coating to increase their durability.

1 Claim, No Drawings

METHOD OF RESTORING OR REPAIRING REFLECTIVE GLASS

BACKGROUND OF THE INVENTION

1. Field of the Invention

This invention relates generally to coatings deposited on transparent articles and, more particularly, to novel methods for restoring or repairing coatings deposited on transparent substrates which have been damaged by scratches, abrasive rubs or the like.

2. Description of the Prior Art

Because of the increasing costs of and the inadequate supplies of available energy, the number of reflective windows employed for conserving energy, particularly in commercial buildings, is increasing. Heretofore, when the coating of a reflective window was damaged, the window was replaced because of the difficulty of restoring the damaged area of the film to its original light transmittance condition. However, the increased cost of reflective windows and the number of such windows in use today makes the replacement of such windows uneconomical. Thus, it is now desirable to develop a method or system for repairing the damages to the coating of a reflective window whereby the light transmittance characteristics of the repaired area is substantially the same as that of the original coating so that it will not be necessary to install a costly new reflective window.

As previously mentioned, a reflective window generally comprises a glass substrate on which a thin transparent film of a metal, metal halide, metal oxide or mixtures or stacks thereof is deposited to reflect a large portion of the solar rays incident thereon and control the transmittance of light therethrough. One type of a commercially available reflective window comprises a heat reflecting chromium based film deposited on the inboard surface of a glass substrate to provide a filmed glass of controlled daylight transmittance in the range of between about 8% to 50%. Such a filmed window will exhibit some reflected color but is substantially neutral in transmittance. As is well known, the transmittance of light through clear glass is over 90%. Thus, when damages such as scratches, abrasive rubs, pin holes or the like occur in the metallic film, the damage is very noticeable because of the great difference of the light transmittance between an intact film area and a damaged film area. Although the metallic film is quite durable, care must be taken to prevent damage thereto during handling and installation. However, due to the complexities and hazards inherent in glazing reflecting windows in buildings, some damage to the film may occur.

SUMMARY OF THE INVENTION

It has now been discovered, and the instant invention is based upon such discovery, that damages of the nature above described to a thin film can be repaired by covering the damaged area with a suitable filler to reestablish the continuity of, and the light transmittance characteristics of, the original film. Thus, the method of repairing a reflective window according to this invention generally comprises the steps of removing any surface debris from the damaged area, covering the damaged area with a filler of a color and transmittance compatible with the damaged film, and coating the repaired area with a protective layer to enhance its durability.

OBJECTS AND ADVANTAGES

A primary object of the present invention is to provide a method of repairing damages to a thin heat reflecting film deposited on a transparent sheet.

Another object of the invention is to provide a relatively simple and efficient procedure for restoring the light transmitting characteristics of a reflective window in which damages have occurred.

Other objects and advantages of the invention will become apparent during the course of the following description.

DESCRIPTION OF THE PREFERRED EMBODIMENT

As is known, a reflective window may be produced by coating one surface of a glass sheet of the desired size and shape with a vacuum evaporated metallic oxide film of a thickness to provide a window exhibiting the desired optical properties.

As previously mentioned, the metallic oxide film may be damaged, particularly during glazing of the reflective window in a building, by being scratched by striking objects, or the film may be abrasively rubbed which causes thinning and/or removal of the film, or the film may be struck by welding splatter after it is installed in the building which causes pin holes in the film. These types of damages result either in rendering the reflective window useless for its desired purpose or at least in creating an extremely annoying condition for personnel inside the building.

The present invention produces a repair to discontinuities in the film which substantially restores the film to its original light transmittance condition. Essentially, the invention is a combination of at least three steps which should be used together and which, while not new mechanical procedures per se, have never been used together in the restoration or repair of reflective windows. The first step in repairing a damaged film surface on a glass substrate is cleaning the damaged film area with a chosen, soft cloth to remove any foreign debris therefrom; secondly, covering the damaged film area with a filler of compatible color which is preferably of the same composition as the original film; and thirdly, coating the covered damaged film area with a transparent protective layer which has good color retention, heat and chemical resistance, and durability.

The method of the present invention possesses the important advantages that the three steps in and of themselves are not particularly difficult or expensive to perform, the reflective window can be repaired in its glazed position, and of course, the overall process involves only a fraction of the cost of replacing the reflective window.

The protective layer over the repair may be of any suitable transparent material, with good results being obtained with the use of an acrylic ester resin. Epoxy resins, which take longer to set up than the acrylics but may be somewhat better from a durability point of view, can also be used successfully. This last step of the present invention is of primary importance in protecting the repaired film mechanically.

In the practice of this invention, it was found that various fillers could be employed to mask the transmittance of light through the damaged film area, with the particular type of filler selected being dependent somewhat upon the size and shape or extent of the damage. Thus, the filler, for example, can be a film of the same or similar composition to the reflective film on the substrate, a pressure sensitive, transparent adhesive tape of compatible color, or a coloring agent such as ink. The preferred filler is a film of like composition to the reflective film as its light transmittance will be the same as that of the reflective film. When the original or reflective film is a thin layer of vacuum evaporated chormium material, for example, deposited upon a glass sheet, and the filler is also to be a film of chromium material, a transfer containing such film may be employed to deposit the latter in the area of the damaged film. In such a case the transfer may comprise a thin, polyethylene sheet on which the thin layer of chromium material is depositedby vacuum evaporation, and may also include a protective layer of the before-mentioned type, or an additional vacuum evaporated silica film as disclosed in U.S. Pat. No. 3,505,092 to Ryan et al.

The invention will be described in greater detail hereinafter in conjunction with the following specific examples:

EXAMPLE I

A reflective window comprising a thin film or coating of chromium material exhibiting a silver color and deposited on a glass sheet of nominal one-half inch thickness contained a scratch slightly over 1/32 inch wide in the coating. The scratch was very noticeable due to a difference in light transmittance between the damaged area and the remainder of the glazing, with the daylight transmittance of the glazing with the film intact being 14% and that of the damaged area approximating clear glass.

A filler for repairing the scratch was prepared by providing a film of the same composition and thickness as that on the glazing on a five mil polyethylene sheet. The film was covered with a heat sensitive adhesive layer comprising a 12% concentration of 3M Company's Scotch-Grip contact cement 1357.

The area including and immediately adjacent the scratch was cleaned by wiping it with a soft clean cloth to remove any foreign debris therefrom. The filler comprising the transfer was then placed over the scratch with the exposed adhesive layer against the scratch. Since the transfer had a light transmittance similar to that of the glazing, the scratch was easily seen through the transfer. A heating iron was run over the polyethylene sheet along the scratch with a light pressure to deposit the adhesive layer and film in the scratch. The polyethylene sheet was then stripped from the glass and the repaired area cleaned and coated with a protective layer of an acrylic resin base adhesive, namely, Acryloid A10 adhesive manufactured by Rohm and Haas Corporation, Philadephia, Pennsylvania, to mechanically protect and increase the durability of the repair.

Visual inspection of the glazing showed that the repaired area possessed substantially the same light transmittance as the undamaged filmed sheet with only a prior knowledge of the position of the scratch and a close-up scrutiny thereof enabling one to appreciate that the area indeed had been repaired.

If for some reason the color hue of the repaired scratch is too dark, the hue may be lightened by buffing the repaired area with a fine steel wool. Any overlap of the filler on the surrounding film may be repaired in a similar manner or with a razor blade.

In the event a pressure sensitive adhesive is employed in the above procedure instead of a heat sensitive adhesive, a suitably shaped stylus may be run along the scratch instead of a heating iron.

EXAMPLE II

A glazing produced in the identical manner as that repaired in Example I was found to have a deep scratch between 1/32 inch and 1/64 inch wide extending completely through the coating. After cleaning the area including and immediately adjacent the scratch, black drawing ink was applied to the scratch using a Castell TG pen with a No. 2 point. In this respect no particular attempt was made to keep the ink only in the scratch, so some overlapping took place. After about three minutes the ink was dry and the overlapping ink was removed with a single edge razor blade.

The repaired area was thereafter cleaned and coated with a protective layer of the Acryloid A10 adhesive to mechanically protect and increase the durability of the repair. A small artist's brush was used to apply the protective layer since the width of the layer is not critical due to its being transparent and colorless.

Visual inspection of the glazing showed that the repaired area possessed substantially the same light transmittance as the undamaged filmed sheet and it was very difficult to recognize the repaired area from a distance without prior knowledge of its location.

In the case of deep scratches as encountered in the above example, and using the ink procedure described therein, the repair will usually look satisfactory without further corrections. In the case of shallow scratches, the repair will often look too dark. In these cases, one very lightly buffs the ink line with fine steel wool until the color blends into that of the film.

EXAMPLE III

A glazing produced in the identical manner as that repaired in Example I was found to have a scraped or abraded area somewhat larger than ⅛ inch wide in the film which caused a pronounced increase in light transmittance in such area. After cleaning the damaged area, a pressure sensitive gray transparent tape ¼ inch wide was applied over the area such that it completely covered same with some overlapping on all sides. The overlapped areas were readily visible as they were substantially darker than either the repaired area or the intact filmed area. The dark areas were trimmed away with a razor blade with no damage to the filmed glazing by pushing the blade away from the repaired area.

The repaired area was thereafter cleaned and coated with a protective layer of the Acryloid A10 adhesive to add to the durability of the repair, such adhesive being applied with a small artist's brush.

Visual inspection of the glazing showed that the repaired area possessed substantially the same light transmittance as the undamaged filmed sheet and it was very difficult to recognize the repaired area from a distance without prior knowledge of its location.

The transparent tape repair process as described in the above example is preferably used to repair large damaged areas, i.e., damage streaks or rubs 1/16 inch or wider, rather than deep, very narrow scratches. The process is most effective on damage streaks about ⅛ inch wide and circular damage of about 174 inch diameter.

All the fillers used in the above described examples and applied in accordance with the methods of this invention, will mask the damages in the original film so that the major objection, the increased transmittance of light through the damages, is not noticeable.

It is to be understood that the forms of the invention herewith shown and described are to be taken as illustrative embodiments only of the same and that various changes in the steps of the method of the invention may be resorted to without departing from the spirit of the invention.

We claim:

1. A method of repairing damaged areas in an original thin light transmitting film exhibiting a color and deposited on the surface of a transparent glass substrate, said film comprising one or more layers of a material selected from the group consisting of a metal, metal halide, metal oxide and mixtures thereof, comprising the steps of:
   a. cleaning the damaged areas in the original film to remove any foreign debris;
   b. covering the damaged areas with a transparent filler having similar light transmitting characteristics and exhibiting substantially the same color as the original thin film, said covering step including:
      (1) placing a transfer comprising a sheet containing a transparent film of substantially the same composition and light transmittance as the original thin film and a heat sensitive adhesive over said damaged areas; and
      (2) heating said transfer over the damaged areas to first deposit said adhesive in said damaged areas and then release said transparent film from said transfer whereby said transparent film adheres to and fills the damaged areas in the original thin film; and
   c. coating said filler with a transparent protective layer capable of physically protecting said filler whereby the light transmittant characteristics of the repaired damaged areas are substantially the same as the light transmittant characteristics of the original thin film.

* * * * *

UNITED STATES PATENT AND TRADEMARK OFFICE
CERTIFICATE OF CORRECTION

PATENT NO. : 4,251,572

DATED : February 17, 1981

INVENTOR(S) : Siegfried H. Herliczek et al

It is certified that error appears in the above-identified patent and that said Letters Patent are hereby corrected as shown below:

Col. 2, line 43, "chosen" should be --clean--

Col. 4, line 65, "174" should be --1/4--

Signed and Sealed this

Eleventh Day of August 1981

[SEAL]

Attest:

GERALD J. MOSSINGHOFF

Attesting Officer

Commissioner of Patents and Trademarks